June 27, 1961
J. R. LINCOLN
2,990,010
FOLDABLE WAGON SEAT
Filed April 28, 1959
2 Sheets-Sheet 1
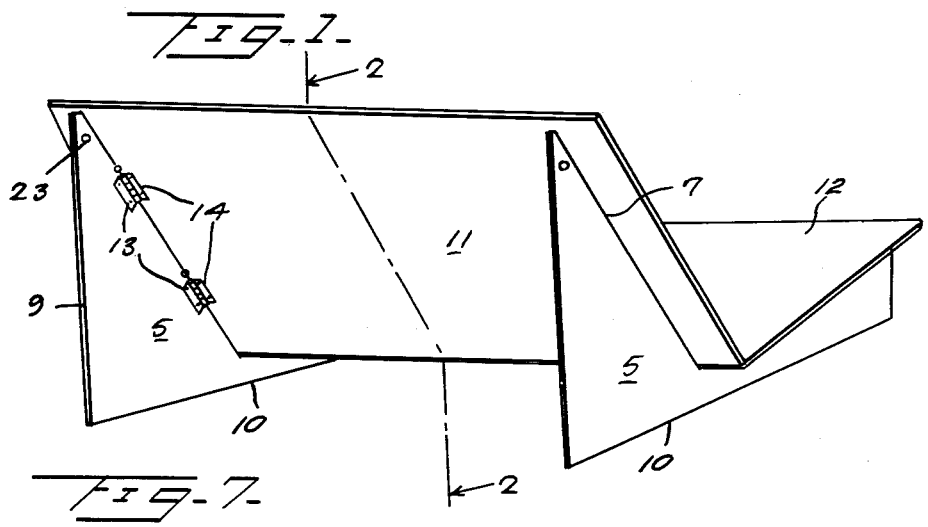
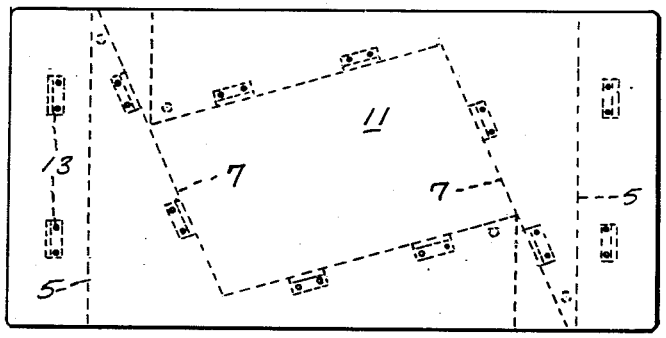
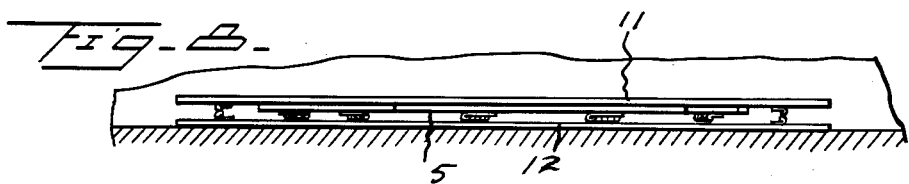
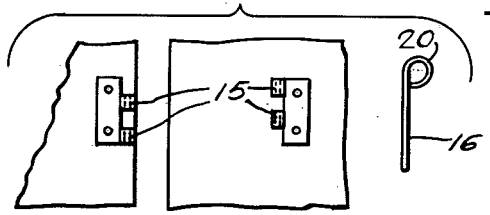
JOHN R. LINCOLN
INVENTOR
BY *CA Snow & Co.*
ATTORNEYS.

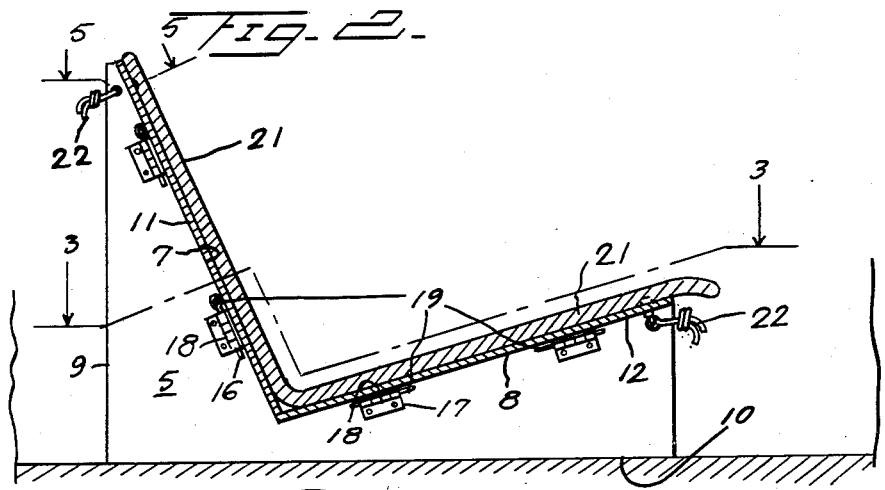
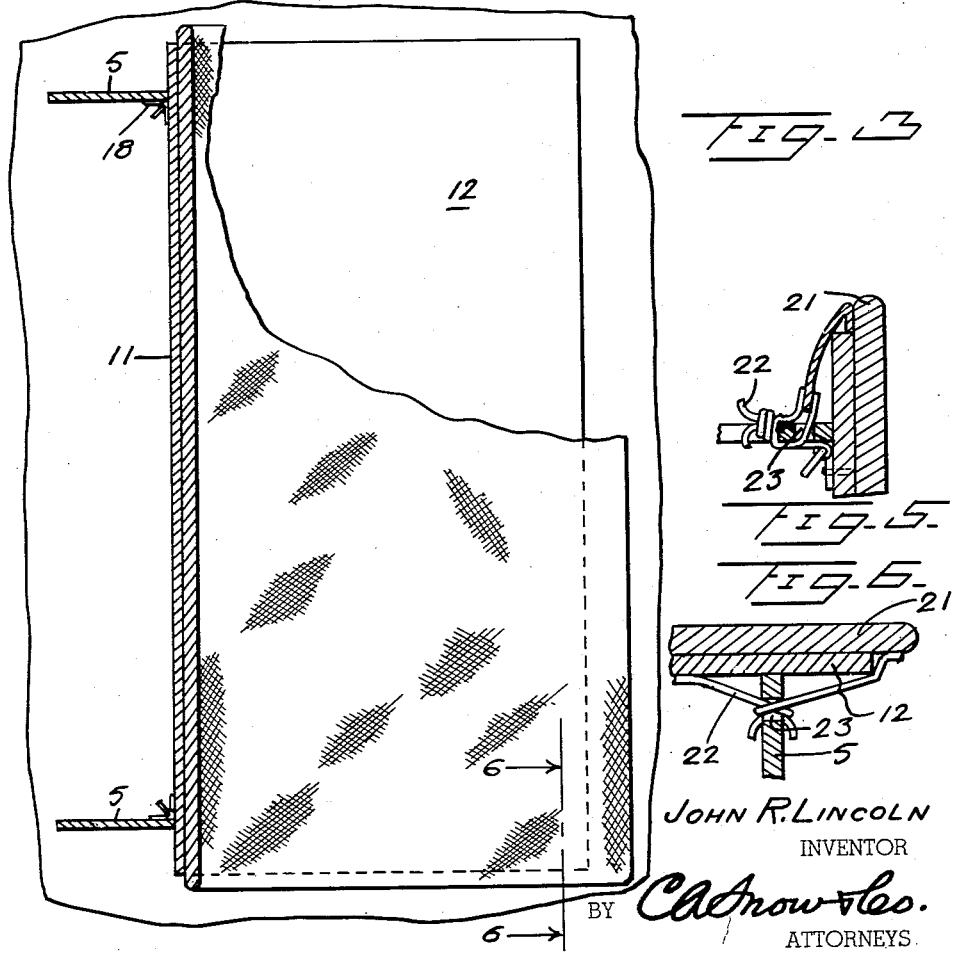

United States Patent Office 2,990,010
Patented June 27, 1961

2,990,010
FOLDABLE WAGON SEAT
John R. Lincoln, Opa-Locka, Fla.
(Rte. 3, Bloomfield, Mo.)
Filed Apr. 28, 1959, Ser. No. 809,381
1 Claim. (Cl. 155—196)

This invention relates to chair or seat construction, the primary object of the invention being to provide a chair or seat of the foldable type designed primarily for providing a third seat for station wagon use, which when folded, may be positioned over the floor of the station wagon, requiring a minimum amount of space to facilitate the storing of the seat when carried in a station wagon out of use.

An important object of the invention is to provide a chair or seat which may be readily extended for use by persons unfamiliar with mechanics and with a minimum amount of effort on the part of the person assembling the seat.

A still further object of the invention is to provide a foldable chair or seat which when extended, will be maintained in an upright position against collapsing under the weight of persons occupying the seat.

With the foregoing and other objects in view which will appear as the description proceeds, the invention consists of certain novel details of construction and combinations of parts, hereinafter more fully described and pointed out in the claims, it being understood that changes may be made in the construction and arrangements of parts without departing from the spirit of the invention as claimed.

Referring to the drawings:

FIGURE 1 is a perspective view taken from the rear of a seat constructed in accordance with the invention.

FIGURE 2 is a sectional view taken on line 2—2 of FIGURE 1.

FIGURE 3 is a sectional view taken on line 3—3 of FIGURE 2.

FIGURE 4 is an exploded view illustrating fragmental portions of the side panels and rear panel or back panel with hinge sections attached thereto.

FIGURE 5 is a sectional view taken on line 5—5 of FIGURE 2.

FIGURE 6 is a fragmental sectional view illustrating the manner of securing a cushion on the seat.

FIGURE 7 is a view illustrating the seat as collapsed and ready for storing.

FIGURE 8 is a side elevational view of the seat as collapsed.

Referring to the drawings in detail, the side panels of the seat are indicated by the reference character 5 which side panels have their upper edges cut away in substantially V-shaped form providing inclined upper surfaces 7 and 8 and substantially straight rear edges 9 and bottom edges 10 which are also straight to rest squarely on the bottom of the floor of the station wagon in which the auxiliary seat is used.

The reference character 11 indicates the rear or back panel section which rests against the inclined surface 7, while the seat panel 12 rests on the inclined surfaces or edges 8, as better shown by FIGURE 2 of the drawings.

As shown, hinge sections 13 are provided on the inner surfaces of the side panels 5, while hinged sections 14 that cooperate with the hinge sections 13, are secured to the rear surface of the back panel section 11, both hinge sections embodying pin loops 15 which when moved together, accommodate the pins 16, pivotally connecting the back section or panel 11 to the side sections 5.

Hinge sections 17 are also carried by the side panels that are arranged on the inner surfaces thereof, which hinge sections 17 cooperate with hinge sections 18 that are connected to the lower surface of the bottom panel 8. These hinge sections also include cooperating loops 19 through which pins such as indicated at 16, are extended pivotally connecting the hinge sections. Each of the pin sections 16 is formed with an eye 20 in which a suitable tool may be positioned to withdraw the pins from the hinge sections to disconnect the panels, but provide means for pivotally connecting the sections when the sections of the seat are assembled.

The reference character 21 indicates a cushion which is provided with strings or straps 22 that may be extended through openings 23 in the side and bottom panels and tied, as better shown by FIGURES 2 and 6 of the drawings.

From the foregoing it will be seen that due to the construction shown and described, the side panels may be readily and easily disconnected from the back panel and seat panel to facilitate storing, and by moving the hinge sections of the panels into cooperative relation with respect to each other they will accommodate the pins 16 pivotally connecting the sections so that the seat may be readily assembled for use.

It will of course be understood that any suitable material may be utilized in the manufacture of the auxiliary seat, such as plywood.

Having thus described the invention what is claimed:

A foldable wagon seat comprising; two side panels of relatively thin material having straight bottoms, front edges and rear edges, said panels having substantially V-shaped cut away portions in one of the edges thereof forming upper edges and lower edges, said panels being provided with openings in the surface areas thereof adjacent the juncture of the lines defining the rear edges thereof and upper edges thereof and openings in the surface areas thereof adjacent the juncture of the lines defining the lower edges and the front edges thereof; a back panel of relatively thin material having a front and a rear side removably affixed to the upper edge of the V-shaped cut away portion; a seat panel of relatively thin material having a top and a bottom side removably affixed in the lower edge of the V-shaped cut away portions, said upper edges providing a support for said back panel and extending substantially all the way up the rear side thereof, said lower edge providing a support for said seat panel and extending substantially all the way across the bottom side thereof, said back and seat panels extending over the cut-edges of the side panels; separable hinge means assembling said seat panel and said back panel to said side panels, said separable hinge means comprising hinge sections fixedly mounted to said upper and lower edges of the cut away portions of said end panels, hinge sections fixedly mounted to the bottom of said seat panel and to the rear side of said back panel and disposed to co-operate with the hinge sections of said end panels, said hinge sections having integral therewith co-operating loops providing a longitudinal socket when said sections are in co-operating relationship, a pin receivable in said socket, said pin having an eye at one end thereof whereby it may be withdrawn with a suitable tool; and a cushion having a major dimension co-extensive with the length of said back panel in contact with said upper edge plus the length of said seat panel in contact with said lower edges, plus an overhang length, and a minor dimension co-extensive with the width of said seat and back panels, said cushion being provided with straps adjacent the corners thereof whereby said cushion can be affixed to said openings by said straps.

References Cited in the file of this patent

UNITED STATES PATENTS

| | | |
|---|---|---|
| 573,250 | Weber | Dec. 15, 1896 |
| 861,454 | Garrison | July 30, 1907 |
| 1,489,679 | Thornton | April 8, 1924 |
| 2,333,073 | Mueller | Oct. 26, 1943 |
| 2,444,991 | Hunter | July 13, 1948 |
| 2,528,676 | Walters | Nov. 7, 1950 |
| 2,707,514 | Smith | May 3, 1955 |

FOREIGN PATENTS

| | | |
|---|---|---|
| 20,568 | Great Britain | 1891 |